United States Patent Office 2,728,752
Patented Dec. 27, 1955

2,728,752

TERTIARY-BUTYL ETHYLENE IN ETHYLENE POLYMERIZATION

Herbert C. Brown, West Lafayette, Ind., assignor to Standard Oil Company, Chicago, Ill., a corporation of Indiana No Drawing. Application November 18, 1952, Serial No. 321,281

12 Claims. (Cl. 260—88.1)

This invention relates to an improved process of polymerizing ethylene and has particular reference to a process of preparation of solid polyethylenes that have softening temperatures above about 100° C. and are useful synthetic resins.

It is known to polymerize ethylene either in liquid or gaseous phase (U. S. 2,475,648) and in the presence of different catalysts such, for example, as oxygen, oxygen-rich compounds, and certain active-free-radical fragmentation compounds also termed free-radical initiators including, for example, certain diazo compounds. Certain high pressure processes employ oxygen or organic peroxide compounds as the catalyst. A catalyst for effecting ethylene polymerization at remarkably low pressures is a dioxydiformate having the general formula

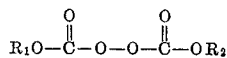

in which $R_1$ and $R_2$ are alkyl radicals (U. S. 2,475,648). A catalyst of this type has also been employed in polymerization of ethylene wherein the ethylene is dispersed in a carrier liquid (U. S. 2,475,643). Carrier liquids are used primarily and with varying effect to prevent the accumulation of difficulty removable polymer in reaction vessels and to provide a means for carrying the polymer out of the reaction zone.

Polymerization of ethylene is employed to a large extent in the production of a polymer that is used in the form of thin films and thus the polymer should be tough, flexible, and extensible. A primary object of the present invention is the provision of a process that will provide a modified polyethylene of an increased flexibility and extensibility. It is another object of the invention to provide a method of modifying the polymerization of ethylene to provide a polyethylene that is flexible and extensible. The invention has for other objects such other advantages or results as will be found in the specification and claims hereinafter made.

The foregoing objects can be accomplished by polymerizing ethylene in the presence of a small amount, i. e., 1.0% to 25% by weight, based on the ethylene, of tertiary butyl ethylene. Tertiary butyl ethylene, preferably present in amounts between about 5.0% and 20% by weight based on the ethylene, modifies the polymerization so that more extensible, less dense polymers are produced. The larger amounts of tertiary butyl ethylene within the given range apparently copolymerize with the ethylene.

Ethylene polymerization in the presence of the said tertiary butyl ethylene and, preferably, a liquid reaction medium such, for example, as an aqueous solution of surface-active agent, benzene, tertiary butanol, dimethylneopentylcarbinol, a perfluorocarbon, or neopentane, is generally performed at temperatures below the softening temperature of the polymer, for example, between about 40° and 100° C. However, the polymerization can be performed at temperatures between 100° and 175° C., in which case the polymer will be carried out of the reactor in the reaction medium and will be precipitated on cooling. Pressures within a range of about 1000 to about 30,000 p. s. i., and preferably between about 5,000 and 20,000 p. s. i. g. are employed. Higher pressures can also be employed, since higher pressures have a tendency to increase the yield and quality of the polymer. Depending upon the other reaction variables and upon the nature of the product desired, the polymerization period may vary from less than about 1 to about 50 hours. Generally, the reaction rate will not vary materially with variation in pressure, the limiting rate apparently being the rate of solution of ethylene in the selected liquid reaction medium.

The polymerization modifier of my invention is useful in the catalytic polymerization of ethylene wherein a free-radical-initiator catalyst is employed. This catalyst can be oxygen, a high oxygen content compound, e. g., tertiary butyl peroxide, a diazo compound, or an organic dioxydiformate, also termed peroxydicarbonate, e. g., diethylperoxydicarbonate.

Whether the tertiary butyl ethylene acts by increasing the solubility of polyethylene in ethylene during polymerization, or by modifying the polymerization process, in somewhat the same manner as do higher temperatures or higher pressures, to, for example, increase branching and decrease polymer density, or whether some other effect, such as chain termination, is predominant, is not determined. The fact remains that the addition of tertiary butyl ethylene to the polymerization mixture, as demonstrated in the specific examples, results in the production of flexible and extensible polymers, uniquely characterized, in addition, by a descending density with increase in content of modifier. This decrease in density, particularly marked when higher proportions (5–10–15%) of tertiary butyl ethylene are employed, indicate a branching of the polyethylene and copolymerization of the modifier with the ethylene. Thus I provide, as a new plastic, a copolymer of ethylene and tertiary butyl ethylene in which the latter is present in an amount between about 5% and 20% by weight of the polyethylene.

The ethylene charging stock that is employed in this process can be prepared by any of several known methods. Thus, ethylene may be obtained from petroleum refinery gas streams, e. g., streams derived from thermal or catalytic cracking processes, from high temperature cracking of propane, by catalytic dehydrogenation of ethane, by treatment of ethane-oxygen mixture at high temperatures, by catalytic dehydration of ethanol, and the like. The ethylene streams subjected to polymerization should be substantially free of oxygen and sulfur or their compounds, and free of nitrogen compounds. I prefer to employ ethylene charging stocks having less than about 10 parts by weight per million of molecular oxygen or less, no sulfur or nitrogen compounds, and containing at most very small proportions of higher olefins, such as propylene or butylene and an extremely small amount of acetylene.

The extensibility of polyethylene manufactured, according to the present invention, in the presence of tertiary butyl ethylene, was determined by means of A. S. T. M. Test D 882–49T for tensile properties of thin plastic sheets. A specimen of the sampled polymer which can be either 3 or 4 inches in length and between 1 and 0.1875 inch in width is clamped between two opposing grips. The grips are separated at a uniform rate so as to stress the specimen at a rate between 10,000 and 30,000 pounds per square inch per minute. The stretching is continued until the specimen ruptures. The extensibility of the samples was tested, according to the preceding test method, in an Instron tensile tester manufactured by the Instron Engineering Corporation, Quincy, Massachusetts, and is reported in terms of percentage elongation. The percentage elongation is calculated by dividing the elongation at the moment of rupture of the specimen by the original distance between the grips of the machine and multiplying by 100.

Polyethylene formed in the presence of dioxydiformate catalysts but in the absence of modifier usually exhibits an elongation of less than about 100 percent and substantially always less than 200 percent. Amounts of tertiary butyl ethylene from as low as 0.5 percent to 1.0 percent show an increasing effect upon the extensibility and flexibility of the polymer especially when the tertiary butyl ethylene is used in conjunction with liquid reaction media.

When as high as 25 percent by weight concentration of tertiary butyl ethylene was used in the polymerization reaction mixture, a deleterious effect upon the yield and extensibility of the polymer was observed. While 25 percent of tertiary butyl ethylene may be suitable under certain circumstances of temperature, reaction rate, catalyst, or reaction media, generally speaking this value is the top limit of operable concentration of tertiary butyl ethylene and preferably the concentration of the modifier should be kept below 20 percent.

SPECIFIC EXAMPLES

In the table shown below six specific examples of polymerization of ethylene in the presence of a free-radical-initiator catalyst and of tertiary butyl ethylene as a polymerization modifier are reported. As the concentration of tertiary butyl ethylene was increased from 5 weight percent, based on the weight of ethylene, to 15% an increase in the extensibility of the so-produced polymer from about 300% to about 500% was observed. The relatively low yield in Example 2 was caused by using an impure tertiary butyl ethylene. When the modifier was more carefully purified, an increase in the yield of about 25% was obtained. In Example 5 a higher average temperature was employed in order to establish more nearly optimum conditions for an azo-type catalyst; otherwise, conditions of temperature, time (4 hours), and pressure were maintained substantially uniform in order to compare the effect of increasing the amount of tertiary butyl ethylene. In Example 6 some benzene was also employed in the polymerization reaction mixture. The benzene appeared to decrease the yield and had little, if any, beneficial effect on the extensibility of the polymer. The polymers produced by each of the six examples were tough and flexible and well suited for commercial use.

*Ethylene polymerization in presence of tertiary butyl ethylene*

TABLE

| Example No. | DEPC,[1] percent | TBE,[2] percent | Avg. Temp., °C. | Sp. Visc. ×10[5] | Yield, percent | P, p.s.i.g. | Elongation, percent |
|---|---|---|---|---|---|---|---|
| 1 | 0.05 | 5.0 | 56 | 40,500 | 17.0 | 15,300 | abt 300 |
| 2 | 0.10 | 10.0 | 55 | 23,800 | 10.6 | 15,000 | abt 400 |
| 3 | 0.10 | 11.1 | 55 | 26,000 | 13.2 | 15,000 | 385 |
| 4 | 0.10 | 16.0 | 55 | 14,100 | 19.8 | 15,000 | 448 |
| 5 | (3) | 15.0 | 90 | 14,000 | 13.4 | 15,000 | 566 |
| 6 | [4] 0.10 | 11.1 | 55 | 18,400 | 11.5 | 15,000 | 430 |

[1] Diethylperoxydicarbonate.
[2] Tertiary butyl ethylene.
[3] Catalyst here is 0.025 wt. percent of azobisisobutyronitrile.
[4] 11.1 wt. percent, based on ethylene, of benzene also added.

Tough and flexible polymer was also produced by continuous polymerization of ethylene in the presence of diethylperoxydicarbonate catalyst, tertiary butyl ethylene, and tertiary butanol as a liquid reaction medium. Although only small amounts of tertiary butyl ethylene were employed (1.34% and 2.60%), polymer from these continuous runs had a lower density than polymer made under otherwise substantially identical conditions but without tertiary butyl ethylene, thus indicating that use of the tertiary butyl ethylene provided a product of less orientation and degree of crystallinity and of potentially greater flexibility. The copolymer that is formed by polymerization of ethylene and tertiary butyl ethylene when the latter is present in the substantial amounts of between 5 and 20 percent by weight of ethylene is characterized by densities ($D^4{}_{24}$) less than 0.9300, whereas polyethylene alone prepared under the conditions herein described exhibited densities higher than 0.9300. The copolymer is further characterized by having an extensibility measured as percent elongation of greater than 200.

I claim:

1. A process comprising polymerizing ethylene at a temperature between 40° and 175° C., at an elevated pressure, and in the presence of a free-radical-initiator catalyst and of tertiary butyl ethylene as a polymerization modifier.

2. A process of polymerizing ethylene, at a temperature between 40° and 175° C., and at an elevated pressure, in the presence of a free-radical-initiator catalyst and between 1.0 and 25 percent by weight, based on the ethylene, of tertiary butyl ethylene.

3. The process of claim 2 in which the polymerization is accomplished in a liquid reaction medium.

4. The process of claim 3 in which the liquid reaction medium is tertiary butyl alcohol.

5. A process of polymerizing ethylene at a temperature of 40° and 175° C., at a pressure between 500 and 30,000 pounds per square inch gauge, in the presence of between 0.005 and 1.0 percent by weight based on the ethylene of an organic dioxydiformate catalyst, and between 1.0 and 25 percent by weight, based on the ethylene, of tertiary butyl ethylene.

6. A normally solid copolymer comprising ethylene and between 5.0 and 20 percent by weight, based on the weight of said copolymer, of tertiary butyl ethylene.

7. A normally solid copolymer comprising ethylene and tertiary butyl ethylene, which copolymer is characterized by having a density of ($D^4{}_{24}$) less than 0.9300 and an extensibility measured as percent elongation of greater than 200, which copolymer contains between about 5 and about 20% by weight of tertiary butyl ethylene.

8. The process of claim 1 wherein the catalyst is an organic peroxide.

9. The process of claim 1 wherein the catalyst is an organic peroxydicarbonate.

10. The process of claim 1 wherein the catalyst is diethyl peroxydicarbonate.

11. The process of claim 1 wherein the catalyst is a diazo compound.

12. The process of claim 1 wherein the catalyst is bisazoisobutyronitrile.

References Cited in the file of this patent

UNITED STATES PATENTS

| 2,327,705 | Frolich | Aug. 24, 1943 |
| 2,691,647 | Field et al. | Oct. 12, 1954 |